United States Patent
Lavi et al.

(10) Patent No.: US 6,453,407 B1
(45) Date of Patent: Sep. 17, 2002

(54) CONFIGURABLE LONG INSTRUCTION WORD ARCHITECTURE AND INSTRUCTION SET

(75) Inventors: Yoav Lavi, Raanana; Amnon Rom, Azor, both of (IL); Robert Knuth, Munich (DE); Rivka Blum, Azor (IL); Meny Yanni, Azor (IL); Haim Granot, Azor (IL); Anat Hershko, Azor (IL); Georgiy Shenderovitch, Azor (IL); Elliot Cohen, Raanana (IL); Eran Weingatren, Tel Hashomer (IL)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/247,686

(22) Filed: Feb. 10, 1999

(51) Int. Cl.$^7$ .................................................. G06F 9/22
(52) U.S. Cl. ........................................... 712/24; 717/5
(58) Field of Search ......................... 712/24, 37; 717/4, 717/5

(56) References Cited

U.S. PATENT DOCUMENTS

| | | | | |
|---|---|---|---|---|
| 4,435,775 A | * | 3/1984 | Brantingham | 711/118 |
| 4,607,332 A | * | 8/1986 | Goldberg | 714/8 |
| 4,610,000 A | * | 9/1986 | Lee | 365/189 |
| 4,897,813 A | * | 1/1990 | Kumbasar | 364/49 |
| 4,931,989 A | * | 6/1990 | Rhodes | 712/211 |
| 5,163,139 A | | 11/1992 | Haigh et al. | 712/206 |
| 5,398,321 A | * | 3/1995 | Jeremiah | 712/216 |
| 5,450,556 A | | 9/1995 | Slavenburg et al. | 712/235 |
| 5,634,025 A | * | 5/1997 | Breternitz | 712/207 |
| 5,748,979 A | * | 5/1998 | Trimberger | 712/37 |
| 5,774,737 A | * | 6/1998 | Nakano | 712/24 |
| 5,828,897 A | * | 10/1998 | Kirsch | 712/43 |
| 5,859,993 A | * | 1/1999 | Snyder | 712/208 |
| 5,950,012 A | * | 9/1999 | Shiell | 712/209 |
| 5,966,534 A | * | 10/1999 | Cooke | 717/5 |
| 5,983,334 A | * | 11/1999 | Coon | 712/23 |
| 6,105,109 A | * | 8/2000 | Krumm | 711/122 |
| 6,321,322 B1 | * | 11/2001 | Pechanek | 712/24 |

FOREIGN PATENT DOCUMENTS

EP          0 723 220 A2     7/1996

OTHER PUBLICATIONS

"Selecting Predecoded Instructions with a Surrogate", IBM Technical Disclosure Bulletin, XP 000370750.
Joseph A. Fisher: "Very Long Instruction Word Architectures And The ELI–512", Yale University, New Haven, CT, 1983, pp. 140–151.
International Publication WO 97/50030 (Bauer et al.), dated Dec. 31, 1997.
J.A. Barber et al.: "MLID Addressing", IBM Technical Disclosure Bulletin, XP–002069681.

* cited by examiner

*Primary Examiner*—Eric Coleman
(74) *Attorney, Agent, or Firm*—Laurence A. Greenberg; Werner H. Stemer; Gregory L. Mayback

(57) ABSTRACT

A method for executing instructions in a data processor and improvements to data processor design, which combine the advantages of regular processor architecture and Very Long Instruction Word architecture to increase execution speed and ease of programming, while reducing power consumption. Instructions each consisting of a number of operations to be performed in parallel are defined by the programmer, and their corresponding execution unit controls are generated at compile time and loaded prior to program execution into a dedicated array in processor memory. Subsequently, the programmer invokes reference instructions to call these defined instructions, and passes parameters from regular instructions in program memory. As the regular instructions propogate down the processor's pipeline, they are replaced by the appropriate controls fetched from the dedicated array in processor memory, which then go directly to the execution unit for execution. These instructions may be redefined while the program is running. In this way the processor benefits from the speed of parallel processing without the chip area and power consumption overhead of a wide program memory bus and multiple instruction decoders. A simple syntax for defining instructions, similar to that of the C programming language is presented.

11 Claims, 8 Drawing Sheets

CONFIGURABLE LONG INSTRUCTION WORD ARCHITECTURE AND INSTRUCTION SET

FIELD AND BACKGROUND OF THE INVENTION

The present invention relates to data processor architecture and, more particularly, to data processor architecture for digital signal processing.

The term "digital signal processing" (DSP) herein denotes any data processing procedures which operate on digital representations of data, particularly, but not limited to, those which represent analog signals or quantities. Hereinafter, the terms "digital signal processor" and "processor" both denote any device which is capable of processing digital data, including, but not limited to, representations of analog signals or quantities.

Digital signal processing algorithms, such as the Fast Fourier Transform (FFT), usually involve complex and intensive computation. Moreover, many DSP applications must run in real time, so a processor's ability to handle a large number of calculations in a short amount of time is of fundamental importance. It is also important that programs for the processor be easy to code and maintain. Furthermore, system power consumption is important for many DSP applications which require low power drain, for example to maximize battery life in cellular phone handsets, laptop computers, and consumer audio equipment. Thus, there are three aspects of a digital signal processor which influence the overall performance of a system based thereon. The first is the program execution speed, the second is the ease of programming, and the third is the power consumption during execution of the program code. In typical applications of digital signal processing, one or more of these aspects are critical.

Execution speed is highly dependent on the extent of parallel processing employed by the processor during program execution. The terms "parallel processing" and "parallel" denote the execution of a plurality of data operations substantially simultaneously. When comparing two processors with the same clock rate, if the first is capable of performing two instructions in parallel (per cycle), while the second is capable of executing only one instruction per cycle, then the first processor has a clear advantage, because if all other conditions are identical, the first processor will execute a program in half the time required by the second processor.

Ease of programming is also vitally important, since the nature of the instruction set has a major influence on the suitability of a processor for different tasks. Today's processors must provide an instruction set that has the properties of flexibility and orthogonality. Flexibility assures that dependencies between instructions are reduced to minimum, thus allowing the programmer to write code freely, without restrictions. Orthogonality frees the programmer from concern over which operands are permitted in the current operation, because orthogonality permits most operands to be used in most instructions. Thus, flexibility and orthogonality in an instruction set reduce the restrictions and hence reduce the burden on the programmer.

Power consumption is dependent on the hardware complexity of the processor, such as the width of data buses, the number of computation units employed, and the number of instruction decoders necessary to handle the different fields in an instruction word.

There are currently two "mainstream" architectures for digital signal processors. Both involve design compromises concerning the three issues mentioned above. The first mainstream architecture is referred to as the "regular" architecture, and is characterized by the execution of a single instruction in a machine cycle. The second mainstream architecture is referred to as the "Very Long Instruction Word" (VLIW) architecture, and is characterized by the execution of several instructions in a single machine cycle. An overview of the prior art can be obtained from DSP Processor Fundamentals—Architectures and Features, by Lapsley, Bier, Shohan, and Lee, Berkeley Design Technology, Inc., 1996., and from some of the technical literature pertaining to currently-available digital signal processors, such as the Texas Instruments "C6" series. Technical documentation provided by the manufacturer for this series of digital signal processors includes the TMS320C62xx CPU and Instruction Set, July 1997, Texas Instruments Incorporated, Houston, Tex. A discussion of the architecture of this digital signal processor is found in "The VelociTI Architecture of the TMS320C6x" by Thomas J. Dillon, Jr., in The Proceedings of the $8^{th}$ International Conference on Signal Processing Applications & Technology, pp. 838–842, September, 1997, Miller Freeman, Inc., San Francisco, Calif.

A regular processor, where a single instruction is executed per machine cycle, features a relatively small program data bus, because it is necessary to fetch only one instruction word (typically 32 bits wide) per cycle. In addition, since only one instruction is executed per machine cycle, the number of computation units in the execution unit of the processor is small (typically 2—an adder and a multiplier). As noted above, the program bus width and the number of computation units directly influence the power consumption of the processor. Thus, the regular architecture is also characterized by a relatively low power consumption. It is also easier to write program code for a regular processor than for a VLIW processor. The inherent disadvantage of the regular architecture is that the execution speed (usually measured in "MIPS", or Million-Instructions executed Per Second) is smaller than that of the VLIW architecture described below.

The second mainstream architecture, the VLIW architecture, implements an instruction set in which a number of simple, noninterdependent operations are packed into the same instruction word. The term "instruction word" herein denotes a set of instructions contained in a single programming step, such that at run-time, the processor executes all the instructions within the instruction word in parallel. Thus, the VLIW architecture requires a plurality of computation units in the processor, along with a corresponding plurality of instruction decoders to analyze the instructions contained in the instruction word fetched from the program memory. VLIW architecture has the advantage of parallel processing, thus increasing the MIPS capability of the processor. VLIW architecture, however, also requires wider memory banks, multiple computation units, and multiple instruction decoders, thus increasing chip area and power consumption. In addition, the skills required of the programmer to write code for a VLIW architecture processor are also inherently higher, in order to exploit the parallel processing capabilities of the processor.

There is thus a widely recognized need for a processor architecture which combines the advantages of the regular architecture and the VLIW architecture, while reducing or eliminating the disadvantages inherent in these two mainstream architectures. It would be highly advantageous to have a processor which has a high execution speed, ease of programming, and low power consumption. These goals are met by the present invention.

SUMMARY OF THE INVENTION

The configurable long instruction word (CLIW) architecture described here is an innovative processor architecture and instruction set design which optimizes processing speed, ease of programming, and power consumption to benefit DSP programming. The present invention combines the advantages of both the regular and VLIW architectures in a flexible design which overcomes the limitations of the current technologies. In a CLIW processor, several instructions may be executed in parallel during a single cycle without the need for an enlarged general program memory bus, and without the need for multiple processor instruction decoders to support the parallel instruction execution. The present invention also represents improvements in the ease of programming, both from the standpoint of the instruction set as well as the syntax of the instructions themselves.

The general concept of the present invention may be better understood with reference to the drawings and the accompanying description.

FIG. 1 illustrates the general composition of an instruction word and the instructions contained therein. An instruction word 2 is composed of at least one instruction, and possibly more instructions. The "width" of an object, such as an instruction, refers to the number of bits needed to code the object. Instruction word 2 as illustrated in FIG. 1 contains an instruction 4, an instruction 10, and an instruction 16, and may contain further instructions, as indicated by the ellipsis ( . . . ). Each instruction of instruction word 2 directs the processor to perform some function. These functions can include, for example, arithmetic or logical operations on data, or directions to the processor to branch to different locations of the program or perform other operations related to the execution of the code. Each instruction of instruction word 2 therefore specifies the precise operation, and may contain additional information which further specifies how the operation executes. The common means of specifying the operation is by an operation code, or "op-code". Certain operations require one or more operands, upon which they work, and this is also specified in an instruction. To illustrate this, instruction 4 contains an operation code 6 and an operand 8. For example, operation code 6 might direct the processor to perform a bitwise NOT operation on the contents of a register, and operand 8 might specify which register is involved. In contrast, instruction 10 contains an operation code 12 and two operands, an operand 14 and an operand 15. For example, operation code 12 might direct the processor to move the contents of a first register to a second register, and operand 14 might specify the first register, while operand 15 might specie the second register. In further contrast, instruction 16 contains only an operation code 18 and no operands. For example, operation code 18 might be a "no operation".

In a regular architecture, an instruction word consists of a single instruction, whereas in a VLIW architecture, an instruction word contains a number of instructions which are executed in parallel to achieve increased execution speed. In prior art implementations, the number of instructions in an instruction word is fixed. In a processor according to the present invention, however, the number of instructions in an instruction word is variable and may change during program execution. Doing so enables a processor according to the present invention to realize increased execution speed along with savings in power consumption and improved ease of programming.

FIG. 2 is a block diagram showing in general the conceptual high-level instruction flow of a prior art processor with a pipeline. 20. The function of pipeline 20 is to provide a steady flow of instruction words from a program memory 30 to the processor's internal logic. The processor's internal logic is able to operate at relatively high speed compared to the fetching of instruction words from program memory 30, so more efficient use of the processor can be made by reducing the time spent waiting for instruction words to be fetched. Once pipeline 20 is filled with instruction words, the processing of an instruction word is completed every cycle, even though it takes a number of cycles to process any single instruction word. In this sense, a pipeline is analogous to a manufacturing assembly line. The general, high-level stages of pipeline 20 are illustrated in descending order as the instruction words propogate from beginning to end. First is a program fetch stage 22, where the instruction word is retrieved from program memory 30, as previously noted. Next is a decoding stage 24, where the instruction word is analyzed by a set of one or more instruction decoders 40, which outputs two sets of controls. The first set of controls goes to an address unit 50 (AU) which fetches the data which the instructions of the instruction word need. For example, an instruction of an instruction word might contain an ADD operation, in which case an addend may be required from data storage. The second set of controls from instruction decoders 40 goes to an execution unit 60 (EU), which utilizes the EU controls to direct the processing of the instructions contained in the instruction word on the data.

Herein, the term "control" denotes a hardware logic level or signal, such as an electrical voltage, as distinct from an instruction. Controls need no further decoding stage to be utilized by execution unit 60, but rather drive execution unit 60 directly to perform operations, which are accomplished by computation units c1 through c4. In contrast, the term "instruction" herein denotes a symbolic entity which represents operations to be performed by the processor, and which must be decoded into controls, for example by instruction decoders 40, in order to be performed by execution unit 60. Since they are symbolic entities, instructions can be arranged, manipulated, and processed independent of the processor, such as by a programmer or a compiler. A finished program ready for execution consists of a sequence of instructions. In summary, then, execution unit 60 does not execute instructions, but rather is driven by controls, such as from instruction decoders 40. It is the processor as a whole which executes instructions of the program.

Execution unit 60 is designed to perform "primitive data operations", which hereinafter denotes basic arithmetic and logical operations, including but not limited to moving data from one location to another, comparing data in one location against data in another location, addition, subtraction, multiplication, division, AND, OR, NOT, and so forth. The specific primitive data operation which is performed depends on the control which is input to execution unit 60. After decoding stage 24, there is a data fetch stage 26, during which address unit 50 fetches the required data. Finally, there is an execution stage 28, where execution unit 60 uses the EU controls to direct one or more computation units (denoted in FIG. 2 as c1, c2, c3, and c4) which are the hardware entities that perform the actual numerical and logical operations of the instructions in the instruction word on the data. Note that the pipeline illustrated in FIG. 2 has only the highest levels of operation shown. Some processors have pipelines with more stages, representing a more detailed breakdown of the basic functions illustrated. Such processors are sometimes referred to as "deep pipelined processors".

With the configurable long instruction word (CLIW) architecture of the present invention, a set of controls corresponding to a decoded instruction word is associated with, and is executed according to, a regular instruction. A regular instruction which causes the processor to execute such a set of controls is herein denoted as a "reference instruction" because it references a set of controls. Such sets of controls may correspond to decoded instruction words containing different numbers of instructions. Hence, a reference instruction may invoke the execution of different numbers of instructions. This is inherently different from the regular or the traditional VLIW architectures described earlier, where an instruction (or group of instructions within an instruction word) is fetched from the program memory, decoded and executed in a manner which is entirely fixed. In a CLIW processor according to the present invention, an instruction can start at the beginning of the pipeline as a reference instruction read from program memory, but before entering the execution phase, the instruction is transformed into the controls corresponding to an plurality of instructions, using a set of controls stored in a pre-loaded, dedicated array of writable processor memory, herein referred to as a "CLIW array" for convenience. Moreover, the set of controls associated with a particular reference instruction is changeable, not only from one program to another, but also within a program. The CLIW array is illustrated in FIG. 3 and FIG. 4, as described below. The term "dedicated" denotes that this array is intended specifically for the purpose of storing controls corresponding to decoded instructions, and the term "writable" denotes that information contained in the array may be freely changed, as opposed to "read-only" memory, which cannot be rewritten.

The CLIW architecture of the present invention also differs significantly from the architecture of prior art processors which utilize "microinstructions" to decode or perform regular instructions. In such prior art processors, every instruction is associated with a fixed sequence of primitive hardware operations, or microinstructions, which are stored during manufacture of the processor in a read-only memory within the processor. When the instruction is to be executed, its corresponding sequence of microinstructions is invoked and executed in a linear fashion according to the timing of a multi-phase clock. The CLIW architecture of the present invention, however, differs from this in a number of important aspects. First, the indended functions are different. Microinstructions are employed as a decoding mechanism to implement single instructions in a sequential fashion, whereas the set of controls associated with a CLIW reference instruction executes multiple instructions in parallel. Second, the set of controls associated with a CLIW reference instruction is changeable and under programmer control, rather than fixed by the manufacturer, as are microinstructions. Third, the set of controls associated with a CLIW reference instruction is stored in writable memory (the CLIW array) rather than read-only memory, so that it may be easily changed by the programmer.

From the programmer's point of view, the CLIW concept according the the present invention allows full utilization of the processor's hardware by re-defining a dynamic-width, user-configurable instruction set as an extension to the processor's native instruction set. That is, the programmer can define new instructions to accomplish special purposes. These programmer-defined instructions can have the same structure and have the same status as any other instructions, including the instructions of the processor's native instruction set. For example, if the programmer wishes to find the minimum Euclidean distance between an input vector to array of given vectors (utilizing an algorithm known as "vector quantization"), the following instruction could be defined, using syntactical conventions well-known in the art, and similar to those of the C programming language:

$$\text{Find\_Eucl\_distance (r4, r0)} \tag{1}$$

{

$a0L=*(r4++)-*(r0++)\|$ $a1+=sqr(a0L)\|$ $a2L=*(r4)-*(r0+rn0)\|$ $$a3+=sqr(a2L); \tag{2}$$

}

The instruction Find_Eucl_distance (r4, r0) shown in Expression (1) and defined in Expression (2) above calculates the sum of the squares of the differences between the components of a vector pointed to by r4 and the corresponding components of a vector pointed to by r0. Find_Eucl_distance (r4, r0) can be invoked in a program exactly as if it were an instruction of the processor's native instruction set. The definition of Find_Eucl_distance (r4, r0), as shown in Expression (2), however, is in the form of an instruction word containing four instructions, each of which is written on a separate line and separated by double bars (‖). In the first line, the contents of the accumulator a0L is set to the difference between the vector component pointed to by r4 and the vector component pointed to by r0, and afterwards, both r4 and r0 are incremented to point to the next vector component. In the second line, the square of this difference (a0L) is added to the contents of accumulator a1. A similar pair of operations is done simultaneously on the second half of the r0 vector components in the third and fourth lines, utilizing accumulators a2L and a3. If there are n vector components, it is necessary to first clear the accumulators and then execute this instruction n+1 times, because the procedures of the second and fourth lines add results computed (in the first and third lines, respectively) during the previous execution.

It is important to note that, to the programmer, this instruction can be executed with arbitrary parameters in place of r4 and r0, and is therefore a general-purpose instruction. It is furthermore important to note that, with the CLIW architecture, an instruction such as Find_Eucl_distance (r4, r0) is defined in terms similar to that of VLIW architecture, and therefore has the speed and processing efficiency of VLIW architecture. However, in a CLIW processor, an instruction such as Find_Eucl_distance (r4, r0) appears in program memory as a regular instruction, and proceeds through most of the pipeline as a regular instruction with the hardware efficiencies and low power consumption of a regular processor. CLIW architecture therefore combines the advantages of both the regular architecture and the VLIW architecture, and additionally provides improved ease of programming.

Typically, each instruction of a definition such as Find_Eucl_distance (r4, r0) would be coded in 24 bits. In a traditional VLIW architecture, a total of 96 bits would therefore be required for such an instruction word. This would in turn require a program memory bus width of 96 bits in order for a traditional VLIW architecture to execute such an instruction in a single cycle. In contrast, CLIW architecture enables an instruction word such as this, or, for example, even an instruction word with up to six parallel instructions, to require a program memory bus of only 48 bits, which is similar to that of regular architecture. Such an instruction can be used any number of times throughout the program code, and will always occupy the regular 48 bits of program data. The additional information required for execution of the instruction word is stored in the dedicated array of writable processor memory (the CLIW array).

In the CLIW processor, the new instruction set is a super-set of the regular instruction set, and can be re-used throughout the code with different operands, as needed in the specific application. Each new instruction is equivalent to a decoded VLIW instruction word and is hereinafter referred to as an "entry" in the CLIW array. As in any instruction, the newly defined instruction, such as Find_Eucl_distance (r4, r0), can be used with different address unit pointers other than r0 and r4 without the need for an additional CLIW array entry, allowing a true programmer-defined instruction set.

Therefore, according to the present invention there is provided a method for defining a new instruction to be executed by a data processor having an instruction set, wherein the new instruction is added to the instruction set, the data processor having an execution unit operative to performing a plurality of primitive data operations according to a plurality of controls, the method including the steps of: (a) providing a dedicated array of writable processor memory having space for at least one entry; (b) providing at least one execution instruction in the instruction set, the execution instruction operative to selecting and executing the at least one entry; (c) determining an operation set which is operative to performing the new instruction, the operation set selected from the plurality of primitive data operations; (d) compiling the operation set into an executable control set selected from the plurality of controls; (e) storing the executable set as an entry in the dedicated array; and (f) providing a pointer to the entry.

Furthermore, according to the present invention there is also provided an improvement to a data processor which executes programs stored in program memory, the processor having an instruction set containing a plurality of instructions, the programs including instructions selected from the plurality of instructions, the processor further having an execution unit operative to executing the instructions of the instruction set, the processor further having at least one instruction decoder operative to decoding instructions of the instruction set that are included in the programs and sending controls to the execution unit for executing the decoded instructions, the improvement including: (a) a dedicated array of writable processor memory for storing entries of predetermined controls for the execution unit, the dedicated array of writable processor memory having space for at least one entry; and (b) at least one reference instruction in the instruction set, the reference instruction operative to directing the sending of an entry of predetermined controls from the dedicated array of writable processor memory to the execution unit, the predetermined controls superseding the controls from the at least one instruction decoder.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
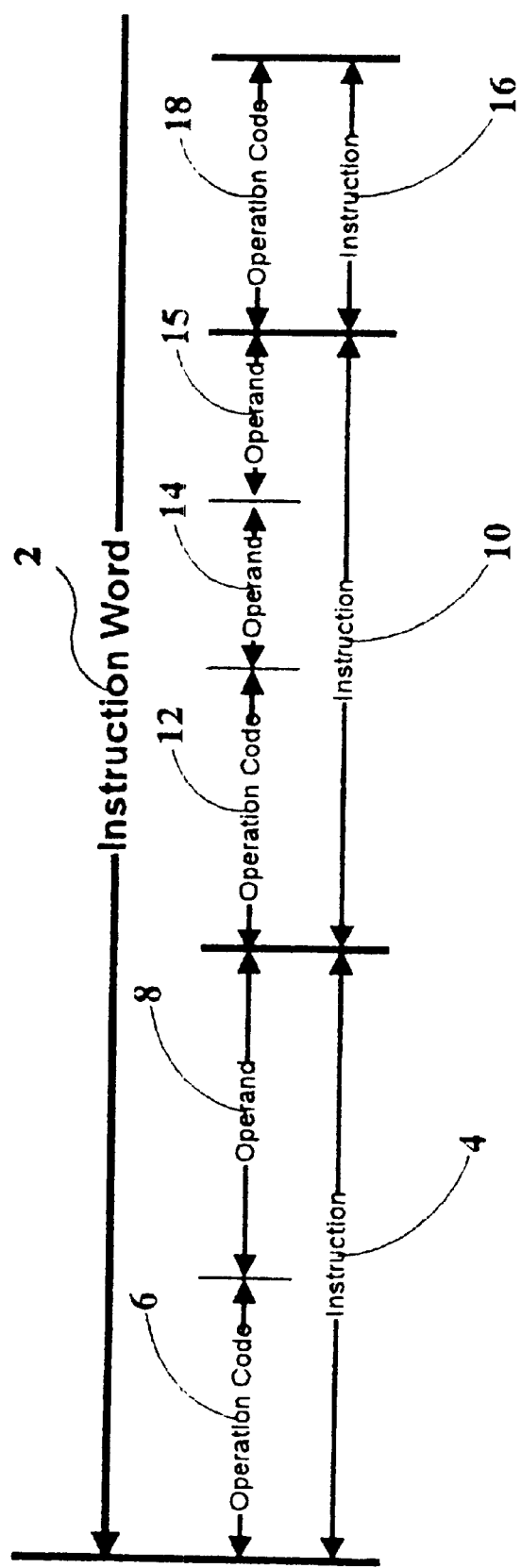
FIG. 1 conceptually illustrates the composition of an instruction word.

The present invention is of an improved architecture for a processor for digital signal processing and other data processing applications, and of a system and method for adding programmer-definable instructions to a processor's existing native instruction set. Specifically, the present invention increases the execution speed of programs while reducing power consumption, and while also improving the ease of programming.

The term "native instruction set" denotes the set of instructions which are executable by the processor as supplied by the processor's manufacturer. With a CLIW processor according to the methods and improvements of the present invention, the programmer can define and add instructions to the native instruction set. These programmer-defined instructions can perform their operations in parallel to attain the increased execution speed, but they appear as regular instructions in program memory thereby attaining the reduced power consumption and improved ease of programming.

The present invention is illustrated, in terms of an example only, by the particular architecture of the CARMEL digital signal processor developed by the present inventors for I.C.Com Ltd. of Israel. This processor is targeted at computation intensive DSP algorithms, where the speed of performing the basic DSP building blocks, such as FFT is crucial to the application. The use of this particular processor as an illustration is not limiting, because the Configurable Long Instruction Word (CLIW) architecture of the present invention can be applied generally in other specific architectures as well.

The CARMEL is a deep-pipelined processor, with four different computation units in its execution unit, and a 48 bits wide program memory bus. Any general (regular) instruction word may utilize up to two out of four computation units in the execution unit. The CLIW architecture further allows this processor to execute up to 6 instructions in parallel (four arithmetic/logical instructions, and an additional two parallel loads from data memory) and generate four addresses for data operands) all in one cycle simultaneously. Instructions may be defined by the programmer according to syntactical conventions well-known in the art, and similar to those of the C programming language. In keeping with the CLIW architecture according to the present invention, the instruction set incorporates a high level of orthogonality for flexibility and ease of programming.

The principles and operation of a processor according to the present invention may be better understood with reference to the drawings and the accompanying description.

Although the Very Long Instruction Word architecture achieves a high execution speed by virtue of the parallel processing inherent in the large number of instructions in each instruction word, the VLIW architecture attains this at the expense of increased programming complexity and power consumption. The huge number of instruction words possible in a VLIW processor makes it impossible to include them all in the instruction set, and therefore the programmer must construct each instruction word used in a program individually according to the specific needs of the portion of the program where they are used. Unfortunately, therefore, few of the coded instruction words are reusable in other portions of the program. Not only is this an increased burden on the programmer, but the processor must have a program memory bus wide enough to handle the entire instruction word, and this in turn means greater power consumption. Thus, the advantages of the VLIW architecture in terms of execution speed are partially offset by the increased complexity and power consumption.

An innovative advance of the present invention is that instructions may be defined by the programmer for general use throughout a particular program or set of programs, and that part of the information required for the operation of such defined instructions may come from a source other than the processor's instruction decoder. In this way, a defined instruction may be contained within a regular instruction word, rather than within a VLIW instruction word, while still benefiting from the parallel processing in a manner similar to that of the VLIW architecture. The use of programmer-defined instructions, where part of the information required for the operation of the defined instructions comes from a source other than the processor's instruction decoder thereby reduces the burden on the processor's program memory bus, enhances ease of programming, and achieves other efficiency improvements as well. To characterize this important new property, the architecture according to the present invention is termed the "configurable long instruction word" (CLIW) architecture. With the CLIW architecture, the execution speed advantage of the VLIW architecture is retained while reducing the complexity and power consumption demanded by the traditional VLIW architecture.

Thus, the information about the programmer-defined instructions comes from two sources. The first source is from the conventional program code, as delivered through the program memory data buses. This portion of the information informs the processor that a CLIW instruction is being performed, and also supplies additional information concerning some of the operands. The second source of information is the CLIW array, which is an array of memory cells which acts as "template", in that it holds the information about how and which operation should be performed in the execution unit, much like the way the regular instruction decoder conveys information to the execution unit, in regular instructions. The information stored in the CLIW array is not regular machine code (which in a prior art processor would be transformed into execution unit controls by the instruction decoders), but the actual controls needed by the execution unit to perform its operations. That is, the CLIW array holds the equivalent of a set of decoded VLIW instruction words, but only regular instructions in program memory are needed to invoke the operation of the individual instruction words. Two immediate benefits of this are reduced hardware complexity (and therefore reduced power consumption) and increased execution speed, as will be described below.

Figure 2:
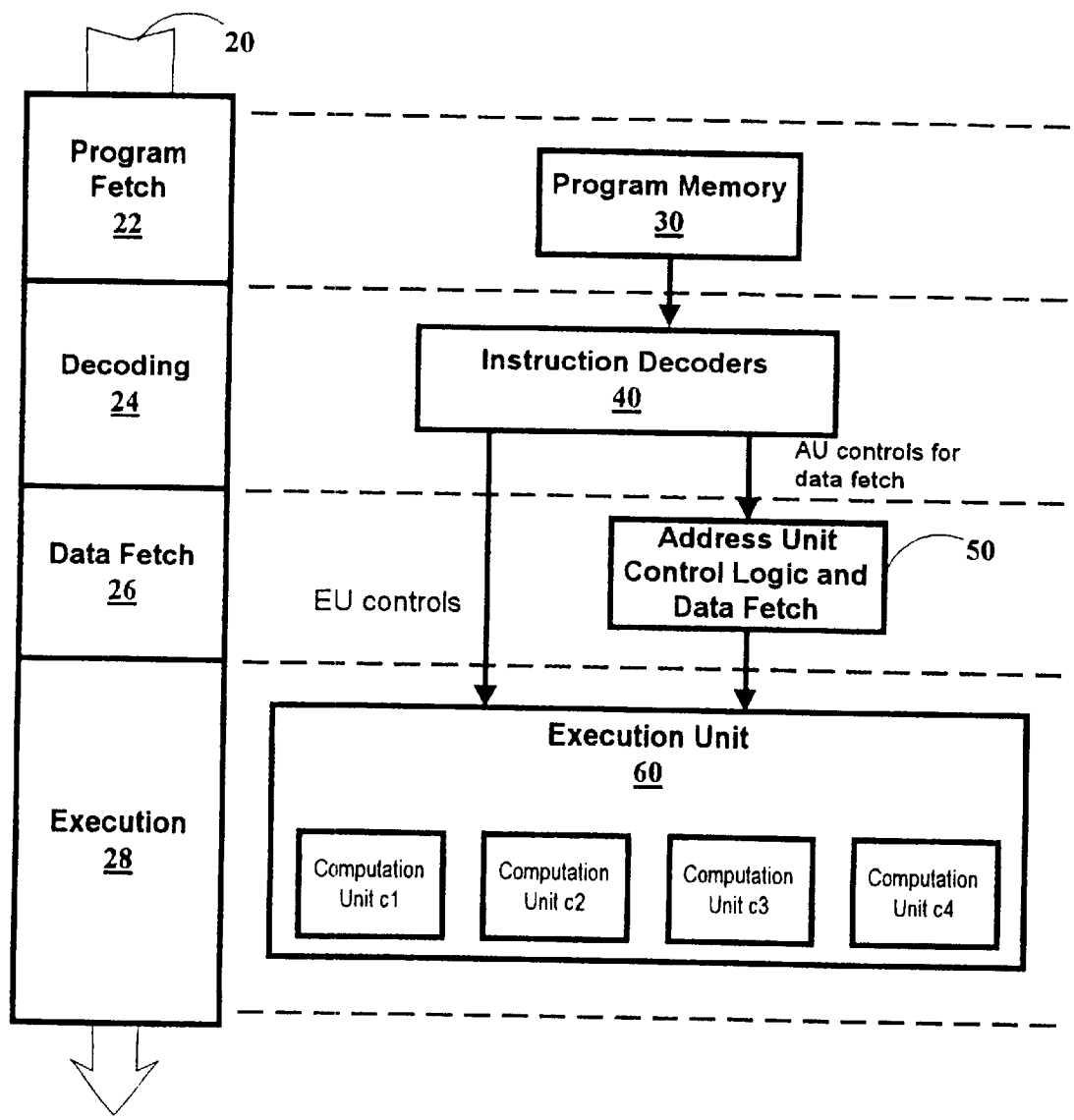
FIG. 2 is a block diagram of a general prior art processor showing the pipeline stages.
Figure 3:
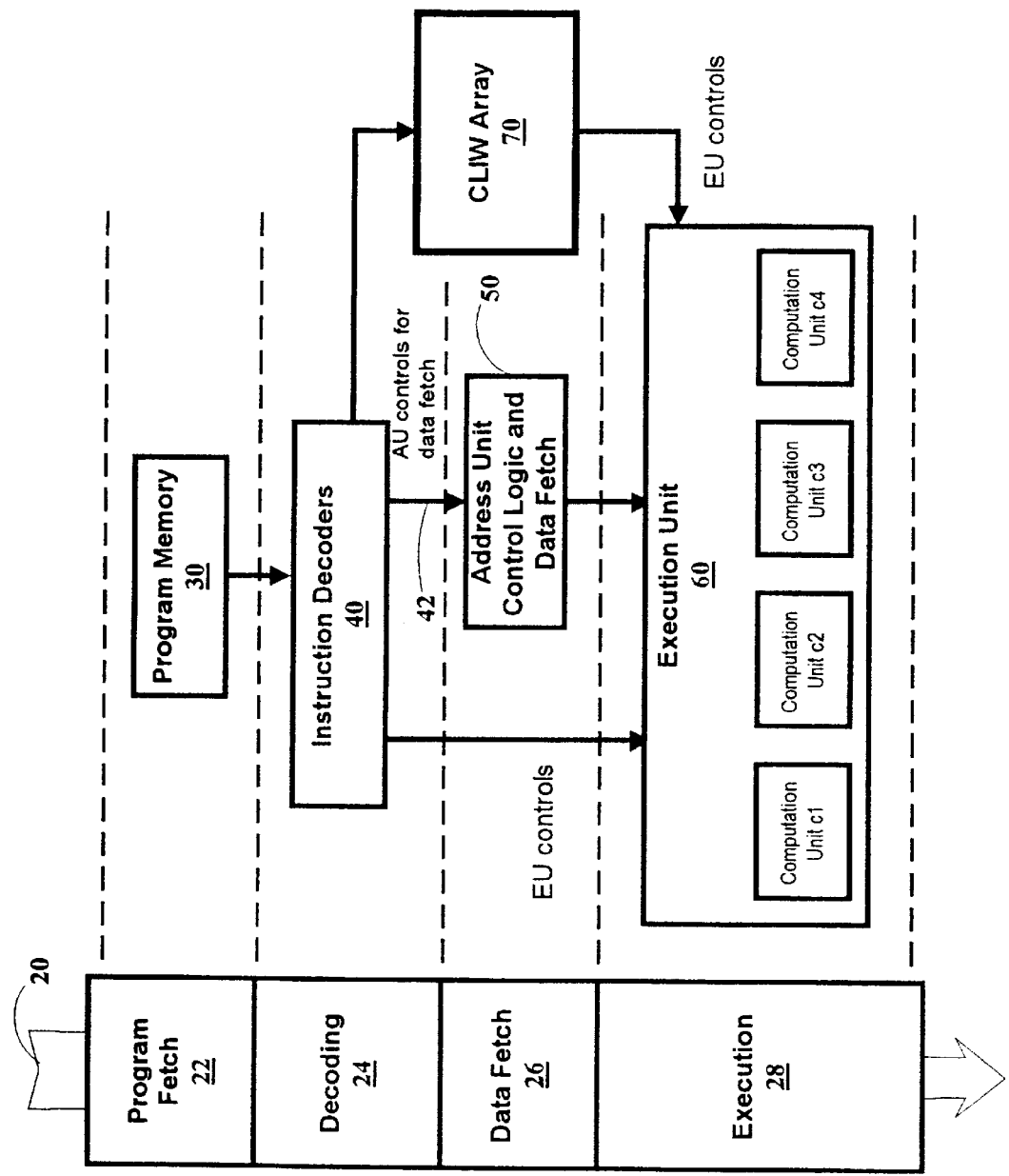
FIG. 3 is a block diagram of an improved processor according to the present invention, showing the pipeline stages and the CLIW array.

FIG. 3 illustrates the general decoding process with CLIW. Here, a CLIW array and support logic of the present invention are seen as an improvement over the prior art processor architecture (FIG. 2). When the processor encounters a CLIW reference instruction (coded with assigned code in the regular instruction set), instruction decoders 40 discriminate the CLIW reference instruction from a regular instruction, and issue a request which will fetch the data from a CLIW array 70 (through lines connecting instruction decoders 40 with CLIW array 70). The information that will be read from CLIW array 70 replaces all of the controls that would normally come from instruction decoders 40 to execution unit 60, for the instruction word to be decoded into controls no longer comes from program memory 30, but rather the controls themselves come directly from CLIW array 70. In parallel to this replacement operation, the instruction decoders further analyze all additional information stored in the reference instruction (usually operands of the CLIW instructions, such as memory addresses, etc., which need to be prepared before execution stage 28). Thus, before the reference instruction fetched from program memory 30 (containing the CLIW instruction) enters execution stage 28, it is replaced by the controls fetched from CLIW array 70, and all relevant variable operands required by the CLIW instruction have also been fetched. The inclusion of variable operands in a reference instruction allow the reference instruction to be used in the same manner as a regular instruction, where the operands are specified in program memory and may vary from one occurrence of the reference instruction in the program to another occurrence of the reference instruction in the program.

Figure 4:
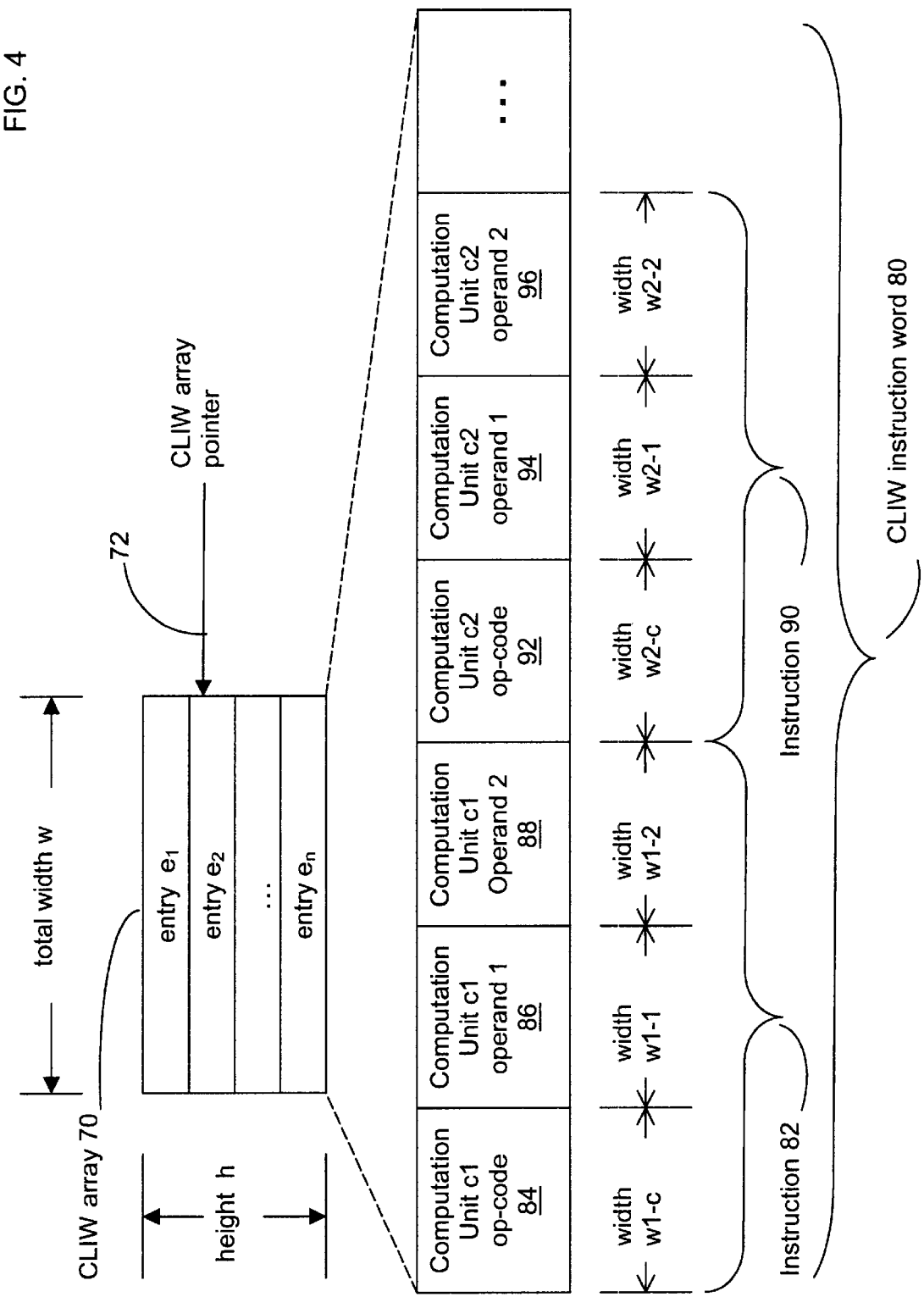
FIG. 4 is a diagram showing details of the CLIW array and its instruction word contents.

FIG. 4 illustrates the general details of CLIW array 70. Shown in FIG. 4 is a CLIW instruction word 80, which is a typical instruction word making up a part of the contents of CLIW array 70. CLIW array 70 contains a number of CLIW instruction words, equal to a height h. Height h equals the number of entries for which CLIW array 70 has space. As illustrated in FIG. 4, CLIW array 70 contains an entry $e_1$, an entry $e_2$, and an entry $e_h$, with additional entries (not shown) indicated by ellipsis ( . . . ). A CLIW array pointer 72 indicates which of the entries (CLIW instruction words) contained in the CLIW array has been selected for execution, and is arbitrarily shown in FIG. 4 as indicating entry $e_1$. Typically, CLIW array pointer 72 is implemented simply as a number indicating the position of the selected entry (CLIW instruction word) in the CLIW array. The number of bits in each CLIW instruction word is equal to a total width W. CLIW instruction word 80 contains a first instruction 82, a second instruction 90, and optional additional instructions (indicated by the ellipsis . . . ). Each instruction consists of several fields. For example, instruction 82 consists of a computation unit 1 op-code field 84 with a width in bits denoted by a width w1-c, a computation unit 1 operand 1 field 86 with a width in bits denoted by a width w1-1, and a computation unit 1 operand 2 field 88 with a width in bits denoted by a width w1-2. A similar set of fields is defined for instruction 90, and would also be defined for the additional instructions not shown (indicated by the ellipsis . . . ). Total width W in bits equals the combined widths of these fields. Instruction 82 corresponds to the intended operation for computation unit c1 (FIG. 3), instruction 90 corresponds to the intended operation for computation unit c2 (FIG. 3), and so forth. The fields of each instruction contain the information required to execute the instruction. For example, op-code field 84 (FIG. 4) designates the particular operation which is to be performed for instruction 82, and the operand fields 86 and 88 designate the location of the data on which the operation of instruction 82 will be performed. The organization of the information inside each field of the CLIW array may vary from one processor to another, and the specific entries contained within the CLIW array are under program control and may be changed during program execution.

Some of the information needed to process a CLIW instruction word does not pertain to the operations performed by execution unit 60. As illustrated in expression (1), for example, the regular instruction for invoking Find_Eucl_distance (r4, r0) that is coded into program memory contains two parameters, r4 and r0. These parameters are used as data sources by the CLIW instruction word defined in expression (2), but execution unit 60 does not manipulate them. Information such as this is properly contained in the data fetched from the regular program memory, using the instruction decoder 40 (FIG. 3). Another example would be memory operands generated by address unit 50. The CLIW array has no need for storing information on these operands, because the data from the CLIW array is used too late in the processing to make use of this information (the data fetch stage is performed before the execution stage). Because of this, the decoding of all memory operands is done in the instruction decoders. Therefore, the information about memory operands is stored in the regular program memory and passed by instruction decoders 40 to address unit 50 via a control line 42 (FIG. 3).

As is well-known and commonly practiced in the art, high-level programming language (as written by the programmer) can be transformed into executable (machine) code by a compiler. For convenience, the term "compiler" herein denotes any entity which transforms programs, instructions, or other operational directives into code which may be executed by a processor, and in addition to utilities commonly referred to in the art as "compilers" also includes, but is not limited to, programming utilities such as assemblers, interpreters, translators, linkers, macro processors, loaders, as well as manual compilation or assembly. Accordingly, the terms "compiling" and "compilation" herein denote the transforming, by any means, of programs, instructions, or other operational directives into code which may be executed by a processor. The term "run-time" herein refers to the regime of processor operation. In contrast, the term "compile-time" herein refers to the regime of work involving compilation, which is preparatory for, and prior to, the executing of programs on a processor. As noted previously, CLIW architecture benefits from pre-run-time compilation in terms of reduced hardware complexity (and therefore reduced power consumption) and increased execution speed. This is because, for a CLIW processor, the compiler also generates the code which loads the CLIW array with the equivalent of decoded VLIW instruction words. This is a compile-time generating process, rather than a run-time decoding process as is the case with VLIW architecture. Therefore, a CLIW processor achieves the same high-speed parallel processing as a VLIW processor, but without the need to perform complex decoding operations while the program is running. This not only reduces the number of instruction decoders and chip area necessary—only regular instruction decoders are needed—but it can also improve performance as well, because the time-consuming decoding has already been done "off-line" by the compiler.

Figure 5:
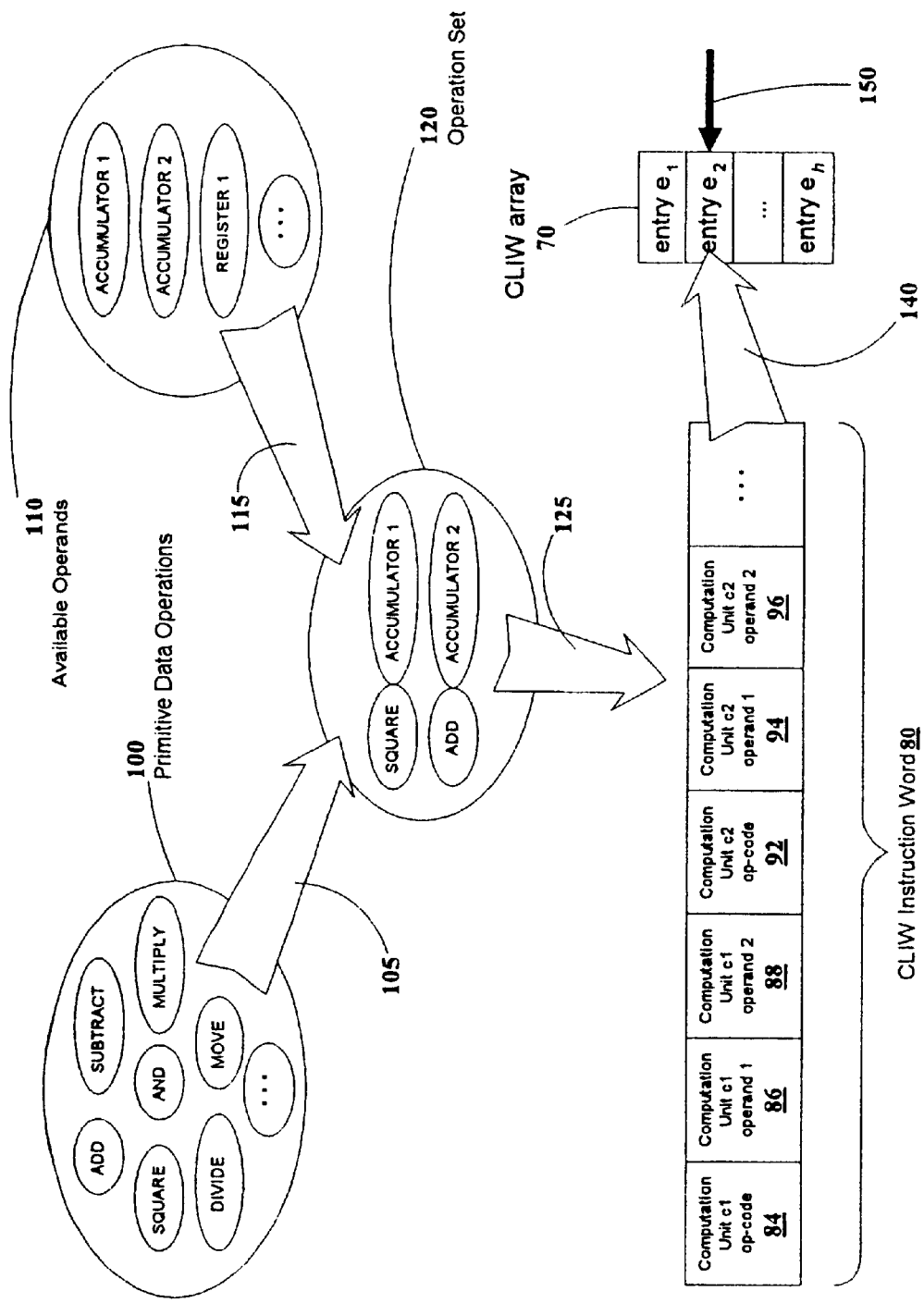
FIG. 5 is a diagram showing the steps in defining a CLIW instruction word.

FIG. 5 illustrates the conceptual procedure for defining a CLIW instruction word corresponding to a desired new instruction. A CLIW processor contains in its execution unit means for performing a set of primitive data operations 100. These primitive data operations include, but are not limited to, operations such as ADD, SUBTRACT, MOVE, and so forth. A CLIW processor also contains a set of available operands 110. These available operands include, but are not limited to, accumulators, registers, and locations in the processor's data memory space. Primitive data operations 100 operate on the data contained in available operands 110 and normally store the results of their operations in available operands 110. To create a CLIW instruction word, the programmer selects one or more operations from primitive data operations 100 in a selection process 105. The programmer also optionally selects operands from available operands 110 in a selection process 115. The programmer can also specify that one or more of these operands, which become part of the new instruction, can be variable operands to be loaded from the program memory. The selected primitive data operations and operands are arranged by the programmer into an operation set 120, which has been determined by the programmer to be operative to performing the desired instruction. Next, operation set 120 is transformed into CLIW instruction word 80 by a compilation process 125. CLIW instruction word contains controls corresponding to op-codes and operands for the various computation units of execution unit 60 (FIG. 3) as previously discussed. The elements of operation set 120 are symbolic in nature, whereas the controls of CLIW instruction word 80 are codes that are directly executable by the execution unit of the processor. The transformation from the symbolic representations in operation set 120 to the codes of CLIW instruction word 80 is done by compilation process 125, which effects a compiling of operation set 120 into an executable control set. Then, CLIW instruction word 80 is stored into a predetermined entry of CLIW array 70 in a storing process 140. The specific entry of CLIW array 70 in which CLIW instruction word is stored is arbitrary, provided the entry is available. Finally, a pointer 150 is provided to access the entry in a reference instruction. At this point, the new CLIW instruction word is available for execution and can be invoked in a program. In this manner, the programmer is able to define and add a new instruction to the existing instruction set. Typically, a CLIW instruction word will execute several data operations in parallel, although this is not necessary.

Figure 6:
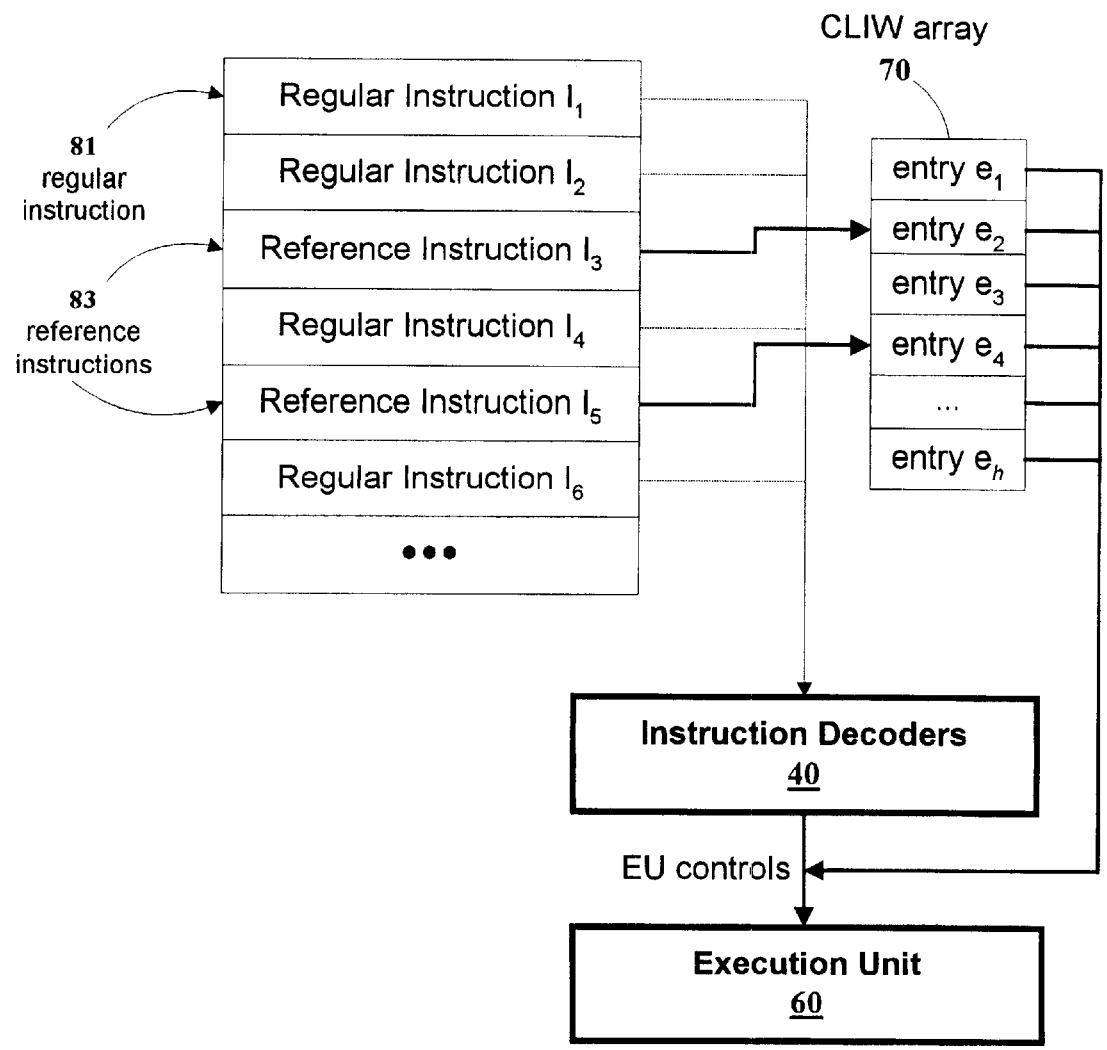
FIG. 6 is a diagram illustrating processor program execution paths for regular and CLIW instructions.

FIG. 6 illustrates conceptually the execution of a program in a CLIW processor. A program 160 contains a sequential set of instructions. Some of the instructions in program 160 are regular instructions, whereas some of them are "reference instructions", which, as previously indicated, denotes instructions which select and execute sets of controls that are stored as entries in the CLIW array. A more detailed breakdown of the execution sequence is shown in FIG. 3, wherein the instructions of the program in program memory 30 travel through the various stages of pipeline 20. The view presented in FIG. 6, however, illustrates the different execution paths taken by the instructions of program 160, depending on their nature. In FIG. 6 it is seen that a regular instruction is passed to instruction decoders 40 in order to generate the EU controls for execution unit 60, whereas a reference instruction for a set of controls performs a selection of the set of controls from the proper entry in CLIW array 70, which then passes the controls (which are EU controls) directly to execution unit 60, bypassing instruction decoders 40 without any further decoding.

An entry in the CLIW array specifies information only about the type of operations to be performed in the execution unit, along with the "internal" operands. "Internal" operands are those which are shared among instructions of the CLIW instruction word that are executed in parallel. For example, the internal operands specified for Find_Eucl_distance (r4, r0) in expression (2) are a0L, a1, a2L, a3, and rn0, so these operands are specified within the entry of the CLIW array.

"External" operands, however, are those which are passed to the CLIW instruction word and are therefore specified by the regular instruction word in program memory. For example, the external operands specified for Find__Eucl__distance (r4, r0) are r4 and r0. Thus, if the programmer wishes to execute the same CLIW instruction with different external operands, no additional entry in the CLIW array will be required, because these operands are specified in the regular instruction located in program memory. Because of this, the configurable long instruction word is similar to regularly executed instructions, and can be used with different operands to perform the same operation. That is, a CLIW instruction word is reusable in different parts of the program to perform similar operations on different data. If different internal operands are required. however, a different entry in the CLIW array will be needed, because there is no way to specify internal operands from a regular instruction in program memory.

Thus, information necessary to fully execute an instruction is divided between the entry in CLIW array 70 (FIG. 3) and the coding of the instruction in program memory 30 as follows: The instruction in program memory 30 contains CLIW array pointer 72 (FIG. 4) which indicates the entry in CLIW array 70 that has the operations template to be executed (equivalent to a decoded VLIW instruction, as previously loaded from program memory 30 by the compiled program). The instruction in program memory 30 also contains information about the external operands, as needed for data fetch stage 26. The CLIW array itself contains information about the operation to be performed (such as add, multiply, square, subtract, etc.) and additional operands which need not be specified until execution stage 28 (such as accumulators, special registers, etc.). When instruction decoders 40 encounter a CLIW instruction (fetched from regular program memory 30), the address of the entry is issued to CLIW array 70 for reading the controls to execution unit 60. The additional data stored in program memory 30 is also decoded (such as memory operands which need to be fetched, and additional information concerning execution unit 60 which has been stored there to reduce total width W of CLIW array 70).

Referring again to FIG. 4, which illustrates the general structure of the CLIW array, it is seen that the width and size of the CLIW array immediately affects the processor's chip area and power consumption, so it is preferable to reduce them to the minimum. Recall that height h corresponds to the number of entries contained in the CLIW array, and that total width W corresponds to the number and complexity of decoded controls for the equivalent VLIW instruction words. Knowledge of the processor's execution unit structure and the desired potential instructions which will constitute the configurable long instruction word instruction set effects the choice of height h and total width w for the CLIW array. For example, height h could be 1024 entries, in which case CLIW array pointer 72 (FIG. 4) would be a 10-bit number, and would require 10 bits of the instruction word in program memory 30. Total width w of the CLIW array will be determined by the number of controls which regularly come from the instruction decoder and which are passed to the execution unit to perform the desired operations. Height h of the CLIW array, on the other hand, determines the number of instruction words in the CLIW instruction set which are available for execution at any given point in the program. For a given processor design, this number may not be sufficient to hold all the desired CLIW instructions for a particular program at the same time, but any such restriction imposed by a limitation on height h can be overcome as described below.

The number of CLIW instructions used throughout a program code in a CLIW processor is not limited to the number of entries which the CLIW array can hold at the same time (height h in FIG. 4), for the CLIW array may be loaded with new entries during program execution, in a part of the code that is not time-critical. Loading new CLIW array entries during run-time is different from loading the original set prior to run-time (usually inside the boot routine, which loads program data contents prior to execution). It is the programmer's responsibility to include code within program memory to load new CLIW array entries, and to decide where they will be loaded.

Figure 7:
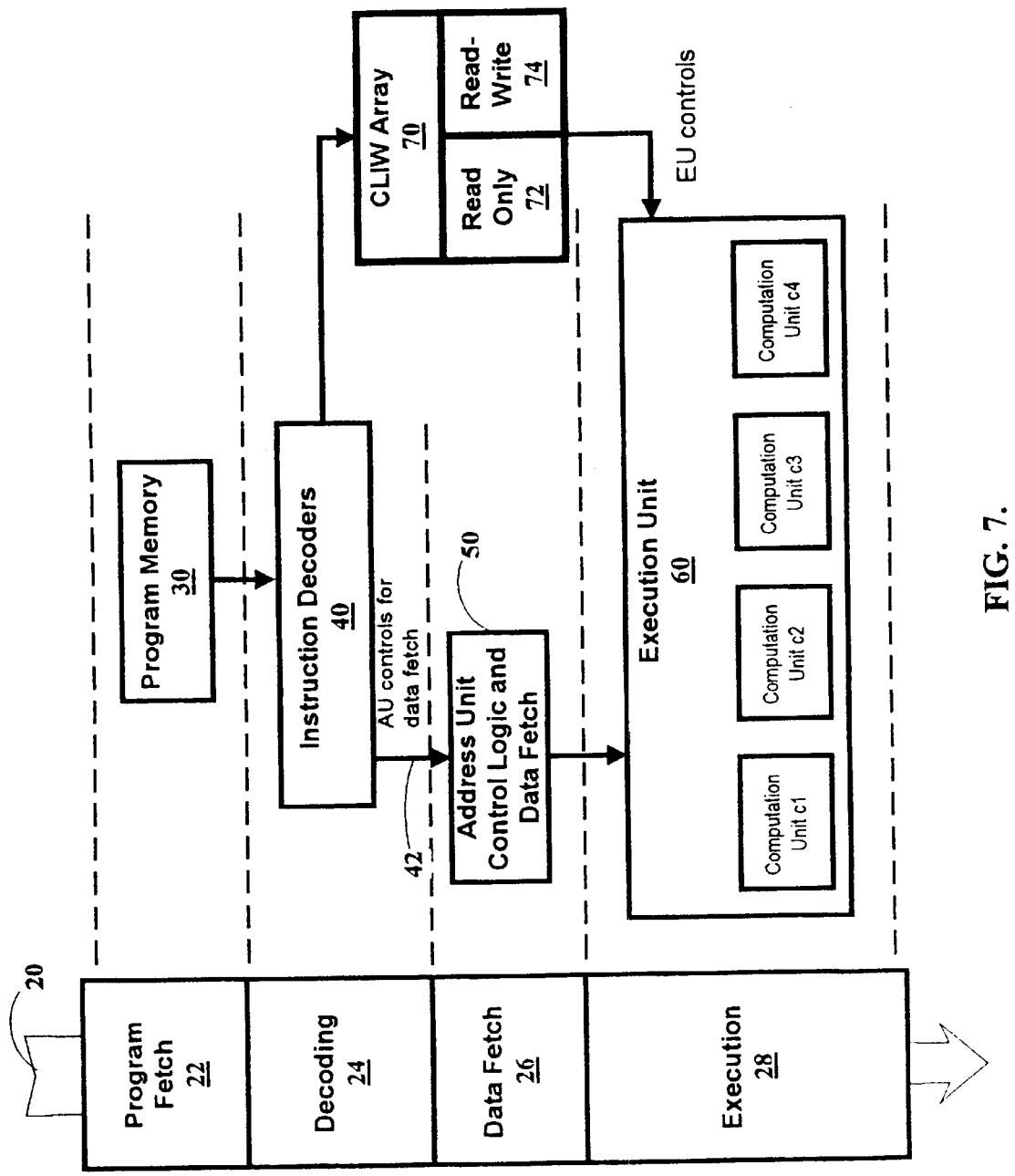
FIG. 7 is a block diagram of an improved processor according to the present invention, showing the pipeline stages and the CLIW array, furthermore utilizing only a single instruction type.
Figure 8:
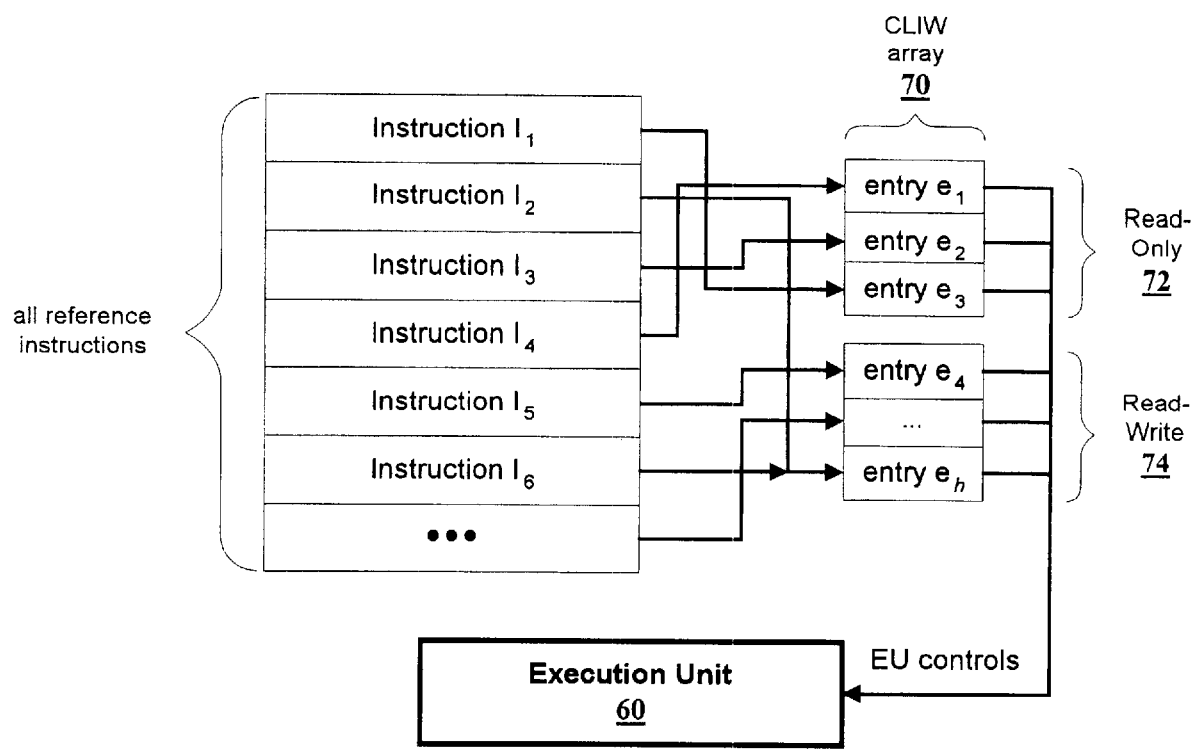
FIG. 8 is a diagram illustrating processor program execution paths for a processor according to the present invention utilizing only a single instruction type.

In the embodiment of the present invention as discussed above, there are two different types of instruction, as illustrated in FIG. 6: One type is a regular instruction 81, whereas the other type is a reference instruction 83. Regular instructions are decoded by instruction decoders 40 in order to send EU controls to execution unit 60. Reference instructions, however, have their EU controls stored in the entries of CLIW array 70, which go directly to execution unit 60 without further decoding. In another embodiment of the present invention, though, there is only one type of instruction. In effect, all instructions of the processor are reference instructions. A block diagram of such a processor is shown in FIG. 7. In this embodiment, all instructions reference sets of controls stored in CLIW array 70, even what would normally be "regular" instructions. CLIW array 70, however, is divided into a read-only portion 72 and a read-write portion 74. That is, CLIW array 70 includes both a dedicated array of writable processor memory as well as a dedicated array of read-only processor memory. Instructions that would normally be "regular" instructions correspond to sets of controls stored in read-only portion 72, and are fixed by the manufacturer at the time of manufacture. Programmer-definable instructions, which correspond to parallel execution of a plurality of instructions, however, correspond to sets of controls stored in read-write portion 74. FIG. 8 shows how these reference instructions in a program would be executed, in a manner analogous to that presented in FIG. 6.

At this point, it is important to distinguish the CLIW array from other types of processor memory. The specific purpose of the CLIW array is to store an executable control set which has been pre-compiled according to a new instruction. This is not a function, purpose, or capability of prior art processor memory. For example, cache memory is intended as local high-speed storage for instructions or data fetched from program memory.

Finally, it should be noted that the CLIW architecture of the present invention significantly enhances the ease of programming by allowing the programmer to freely define and redefine additional instructions whenever it would be beneficial to do so, for increasing the speed of program execution, reducing the size of a program, and/or facilitating programming.

While the invention has been described with respect to a limited number of embodiments, it will be appreciated that many variations, modifications and other applications of the invention may be made.

What is claimed is:

1. A method for defining a configurable long instruction word to be executed as a new instruction by a data processor having a regular instruction set to which the new instruction is to be added, the data processor having an execution unit performing a set of primitive data operations according to a plurality of controls, the method which comprises:

providing a dedicated CLIW-array of writable processor memory having memory space for at least one configurable long instruction word (CLIW);

providing at least one CLIW-reference instruction in the instruction set, said CLIW-reference instruction selecting at least one CLIW in the writable processor memory;

determining an operation set performing the new instruction, said operation set being selected from the plurality of primitive data operations;

compiling said operation set into an executable control set, the executable control set being directly executable by the execution unit;

storing said compiled set of executable controls as the CLIW in said dedicated CLIW-array of the writable processor memory;

the CLIW containing the set of executable controls for various computation units in an execution unit;

the number of executable controls within the CLIW being changeable; and providing a CLIW-array pointer in the CLIW-reference instruction to access the CLIW stored in the writable processor memory.

2. The method according to claim 1, wherein the set of executable controls of the CLIW executes a plurality of data operations in parallel.

3. The method according to claim 1, which further comprises:

executing programs from a program memory with the data processor; and including variable operands loaded from the program memory in the CLIW.

4. The method according to claim 3, which further comprises changing the length of the instruction during the compiling.

5. The method according to claim 4, wherein the step of changing the length is before the step of executing.

6. In a data processor for executing programs stored in a program memory, the data processor having an instruction set containing a plurality of instructions, the programs including instructions selected from the plurality of instructions, the processor further having an execution unit operative to executing the instructions of the instruction set, the data processor further having at least one instruction decoder decoding instructions of the instruction set included in the programs and sending controls to the execution unit for executing the decoded instructions, the improvement comprising:

a dedicated CLIW-array of writable processor memory for storing CLIW, each containing a set of executable controls for execution by the execution unit, said dedicated CLIW-array of writable processor memory having memory space for at least one CLIW; and at least one CLIW-reference instruction in the instruction set, said CLIW-reference instruction directing the sending the set of executable controls from said dedicated CLIW-array of the writable processor memory to the execution unit, said executable controls superseding the controls from the at least one instruction decoder.

7. A data processor for executing a program stored in a program memory, the data processor comprising:

an instruction set containing at least one regular instruction and at least one CLIW-reference instruction selecting at least one configurable long instruction word (CLIW) containing a set of executable controls;

the number of executable controls within the configurable long instruction word (CLIW) being changeable;

at least one instruction decoder discriminating between said at least one regular instruction and said at least one CLIW-reference instruction;

a dedicated CLIW-array of writable processor memory storing at least one CLIW-reference instruction; and an execution unit executing the stored set of executable controls of the configurable long instruction word (CLIW) selected by the CLIW-reference instruction.

8. The data processor according to claim 7, wherein said CLIW-reference instruction includes at least one variable operand.

9. The data processor according to claim 7, including a pipeline.

10. The data processor according to claim 7, wherein the execution of at least one CLIW-reference instruction results in the parallel execution of a plurality of data operations.

11. A data processor for executing a program stored in a program memory, wherein the program contains a sequence of reference instructions, each selecting a set of executable controls stored in a dedicated CLIW-array dividing into a read only processor memory and a writable processor memory, said read only processor memory storing regular instructions each containing a predetermined set of executable controls;

said writable processor memory storing configurable long instruction words (CLIW) each containing a programmer definable set of executable controls precompiled from an operation set selected by a programmer from primitive data operations;

the number of executable controls within a configurable long instruction word (CLIW) being changeable; and an execution being provided for executing the stored set of executable controls selected by the reference instruction of the program.

* * * * *